Feb. 1, 1955   J. W. ROBINSON   2,701,062
COALESCER
Filed Jan. 25, 1952

INVENTOR.
John Warren Robinson
BY
Barlow & Barlow
ATTORNEYS

United States Patent Office 2,701,062
Patented Feb. 1, 1955

2,701,062

COALESCER

John Warren Robinson, Atlantic Beach, Fla., assignor to Fram Corporation, a corporation of Rhode Island Application January 25, 1952, Serial No. 268,210

3 Claims. (Cl. 210—148)

This invention relates to a coalescer of the type used for agglomerating water for the separation of the water from some other liquid with which it is immiscible.

A coalescer of the above character serves to a certain extent also as a filter for removing dirt particles from the liquid being treated and the length of time that the device is operative depends to a large extent upon the capacity of the device for collecting dirt particles which are filtered from the liquid as these dirt particles collect on the surface of the coalescing filtering medium and reduce the flow through the device.

One of the objects of this invention is to increase the like of the coalescing and filtering medium without substantially altering the flow therethrough.

Another object of the invention is to increase the life of the coalescing medium without materially increasing the diameter thereof.

Another object of the invention is to increase the life of the coalescer in a simple and yet effective manner.

Another object of the invention is to increase the life of the coalescer and filter without substantial increase in cost.

With these and other objects in view, the invention consists of certain novel features of construction, as will be more fully described and particularly pointed out in the appended claims.

In the accompanying drawings:

Fig. 1 in a perspective view of the coalescer and filter;

In proceeding with this invention, I utilize the form of a previous coalescer to which I have added a wrap of a coalescing medium about the outer surface of the coalescer and slit this wrapping so that the material to be treated may pass therethrough after the surface of the wrapping has become clogged. This wrapping removes a large part of the dirt particles prior to their reaching the inside similar coalescing and filtering medium and thus leaves the inside coalescing and filtering medium free to act after the outer coalescing medium has become clogged.

Figure 1:
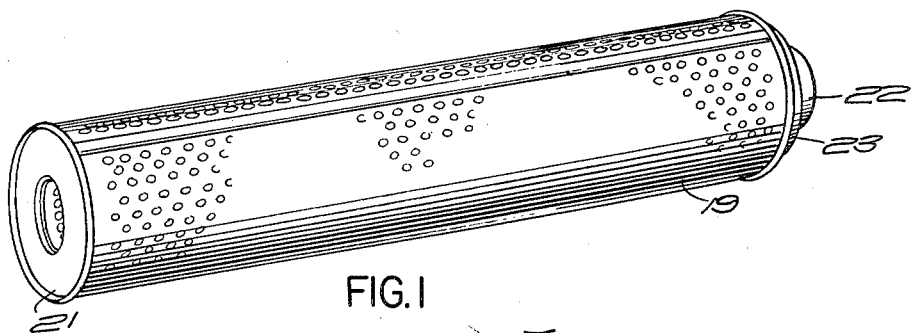
Figure 2:
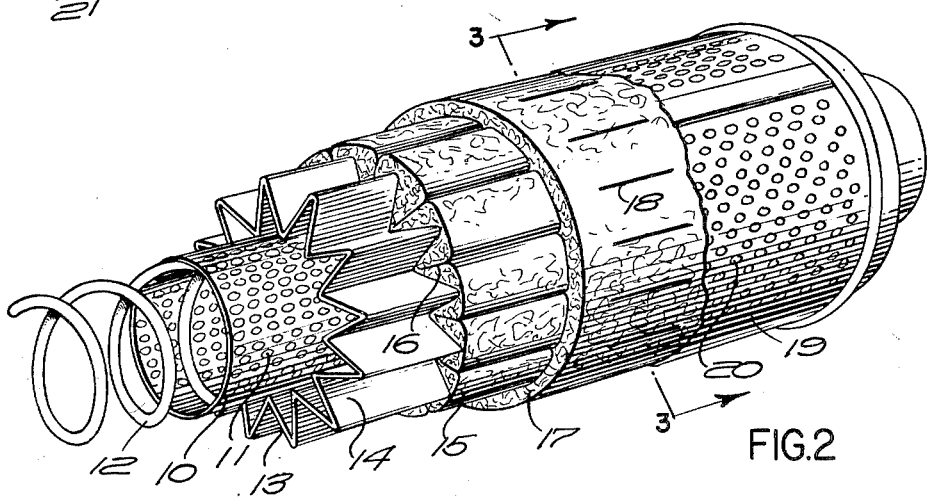
Fig. 2 is a fragmental view showing the coalescer and filter progressively broken away to indicate the several parts thereof.

With reference to the drawings, 10 designates a metallic core which is perforated as at 11 with a multiplicity of perforations and which is strengthened by a reinforcing stiff helical wire 12. Paper 13 is in contact with the core 10 and extends back and forth in a zigzag manner flaring outwardly between the folds as shown in Fig. 2. This paper is of a character which will resist softening from an action of water or the liquid which is being treated or separated. For this purpose, the paper may be treated with a resin. Phenolic resins have been found to be satisfactory. Between the folds 14 of this paper, there is a layer of pleated fiber glass 15 of one micron fiber diameter, the paper serving to support the fiber glass in the folds about its surface following generally the contour of the surface but with the edges of the folds as 16 contacting about the circular extent of this coalescing and filtering medium.

Figure 3:
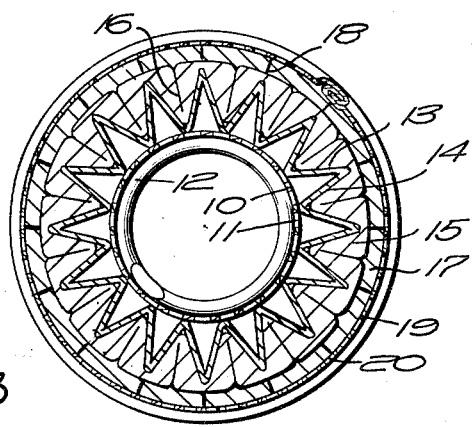
Fig. 3 is a sectional view on line 3—3 of Fig. 2.

Additionally, I provide a layer 17 of fiber glass of three micron fiber diameter which is circularly wrapped about the coalescing filtering medium 15 in one or more layers as shown in Fig. 2 and I further provide slits 18 through this one or more layers as shown in Fig. 3 and at spaced intervals along the layer. I have shown these slits 18 as extending axially or in the direction of length of the device although the direction of extent is not important. Each layer 15 and 17 of fiberglass is in the form of a soft mat of unspun fibers. A casing 19 of cylindrical form extends about the wrapping 17 and is provided with a multiplicity of holes 20 through which the liquid may pass. End walls 21 are provided at the opposite ends of the casing and a collar 22 and soft gasket 23 may be provided for mounting the coalescer in position.

In operation, the liquid such as oil and water and solid contaminant will be passed through the openings 20 in the outer casing 19 and thence through the wrapping 17 where a large part of the contaminant which is present in the mixture of liquids will be removed. The liquid will then pass through the medium 15 and through the phenolic paper into the center core 10 and out through an end thereof.

In this flow inwardly through the walls of the device, the wrapped medium 17 as it is contacted by the liquid will first collect the contaminant which is present in the liquid and after the surface of the wrapping 17 becomes clogged, liquid and its contaminant will then pass through the slits 18 and reach the inner medium 15 which will then collect the contaminant which is present.

In this way a relay action is produced whereby the outer wrapped medium operates until it is clogged, and then when the liquid cannot penetrate through this fibrous layer 17, it will, as its pressure increases, enter the slits 18 and be filtered and coalesced by the fiber glass layer 15. In this way the effective life of the device is greatly increased. It is found that the finer the glass fibers of the medium 15, the better they will act to coalesce the dispersed particles of water carried by the liquid. This is why the fiber glass mat 15 is preferably formed of one micron fibers. Furthermore, the softness of these fibers causes the mat to conform well to the folds of the paper 13. The outer medium 17 is formed of coarser glass fibers so that they will not pack down unduly under the pressure of the liquid.

In tests, it has been found that where the ordinary life of a coalescer constructed as here shown except for the wrapping 17 is 90 minutes, by use of the wrapping, the life will be extended to 190 minutes. Solid contaminant used in such a test is A. C. dust, coarse (a standard graded dust marketed by the A. C. Spark Plug Division of the General Motors Company). The fiber glass 17 which is found satisfactory in this operation is of indefinite length and approximately three microns in diameter. It is provided in a mat form such as a carding from a carding machine and is readily flexible and bendable about the surface to be protected.

I claim:

1. In a coalescer and filter of the outside-in flow type, a core having openings in its walls for the passage of liquid therethrough, a coalescing and filtering medium in the form of a soft mat of unspun fibers disposed about the core, and a second coalescing and filtering medium in the form of a soft mat of unspun fibers wrapped about the first medium and core and provided with spaced elongated slits therethrough disposed about its surface, to thereby provide a relay filtering action in which the outer fibrous mat operates until it becomes clogged and then when the liquid cannot penetrate through this fibrous mat its increased pressure will force the slits open so that the liquid can pass therethrough to be filtered and coalesced by the first mentioned fibrous mat.

2. A coalescer and filter as in claim 1 wherein the first first medium is extremely soft and is formed of fiber glass of a diameter of substantially one micron.

3. A coalescer and filter as in claim 1 wherein both mediums are formed of fiber glass.

References Cited in the file of this patent

UNITED STATES PATENTS

| | | |
|---|---|---|
| 1,229,437 | Foster | June 12, 1917 |
| 1,663,298 | Geer et al. | Mar. 20, 1928 |
| 1,787,577 | Hills | Jan. 6, 1931 |
| 1,947,709 | Garrison et al. | Feb. 20, 1934 |
| 2,196,821 | Arnold | Apr. 9, 1940 |
| 2,550,853 | Nugent | May 1, 1951 |
| 2,555,607 | Robinson | June 5, 1951 |
| 2,575,900 | Vokes | Nov. 20, 1951 |
| 2,626,709 | Kriebel | Jan. 27, 1953 |